United States Patent
Beyeler et al.

(10) Patent No.: US 9,228,849 B2
(45) Date of Patent: *Jan. 5, 2016

(54) SYSTEMS AND METHODS FOR GENERATING ELECTRONIC MAP DISPLAYS WITH POINTS-OF-INTEREST BASED ON DENSITY THRESHOLDS

(71) Applicant: MAPQUEST, INC., Denver, CO (US)

(72) Inventors: Eric Beyeler, Lancaster, PA (US); Tianyu Wang, West Labanon, NH (US)

(73) Assignee: MapQuest, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,225

(22) Filed: Feb. 11, 2014

(65) Prior Publication Data
US 2014/0163874 A1    Jun. 12, 2014

Related U.S. Application Data

(63) Continuation of application No. 13/019,646, filed on Feb. 2, 2011, now Pat. No. 8,681,022.

(51) Int. Cl.
*G08G 1/123* (2006.01)
*G01C 21/34* (2006.01)
(Continued)

(52) U.S. Cl.
CPC .......... *G01C 21/3476* (2013.01); *G01C 21/26* (2013.01); *G01C 21/3682* (2013.01); *G08G 1/20* (2013.01); *H04W 4/02* (2013.01)

(58) Field of Classification Search
CPC .............. G08G 1/20; G08G 1/096827; G08G 1/096811; G01C 21/26; G01C 21/3679; G01C 21/3682
USPC ................... 340/991, 995.19, 995.23, 995.24, 340/995.1; 701/200, 410, 426, 438, 468, 701/440, 527; 705/14.4, 14.49
See application file for complete search history.

(56) References Cited

U.S. PATENT DOCUMENTS 6,108,650 A     8/2000  Musk et al.
6,401,034 B1 *  6/2002  Kaplan et al. .............. 701/416
(Continued)

FOREIGN PATENT DOCUMENTS

JP     2004-239650     8/2004
JP     2009-093384     4/2009
(Continued)

OTHER PUBLICATIONS

International Searching Authority Search Report mailed in PCT/US2012/023224, Sep. 11, 2012 (10 pages).
(Continued)

*Primary Examiner* — Hoi Lau
(74) *Attorney, Agent, or Firm* — Finnegan, Henderson, Farabow, Garrett & Dunner, LLP

(57) ABSTRACT

Methods and systems are provided for generating an electronic map display. In one implementation, a method is provided for determining a route distance based on information for a route, comparing the route distance with a distance threshold, defining a search area when the route distance is less than the distance threshold, the search area including boundaries, calculating, using a processor, a points of interest (POI) density of the search area, comparing the POI density with a first density threshold and a second density threshold, adjusting the boundaries of the search area based on a result of comparing the POI density with the first density threshold and the second density threshold, identifying POIs in the adjusted search area, and providing POI information for an electronic map display, the POI information being associated with one or more POIs identified in the adjusted search area.

20 Claims, 9 Drawing Sheets

(51) Int. Cl.
*G01C 21/26* (2006.01)
*G08G 1/00* (2006.01)
*G01C 21/36* (2006.01)
*H04W 4/02* (2009.01)

(56) References Cited

U.S. PATENT DOCUMENTS

| | | | |
|---|---|---|---|
| 6,751,550 B2 | 6/2004 | Niitsuma | |
| 8,239,130 B1 | 8/2012 | Upstill et al. | |
| 8,401,786 B2 | 3/2013 | Poppen et al. | |
| 8,669,884 B2 * | 3/2014 | Beyeler et al. | 340/995.1 |
| 8,681,022 B2 * | 3/2014 | Beyeler et al. | 340/991 |
| 8,810,437 B2 * | 8/2014 | Beyeler et al. | 340/995.1 |
| 2004/0172193 A1 | 9/2004 | Monde et al. | |
| 2004/0204821 A1 * | 10/2004 | Tu | 701/200 |
| 2005/0177303 A1 * | 8/2005 | Han | 701/209 |
| 2006/0089788 A1 | 4/2006 | Laverty | |
| 2006/0111834 A1 | 5/2006 | Bouget et al. | |
| 2006/0200304 A1 | 9/2006 | Oh | |
| 2006/0287810 A1 | 12/2006 | Sadri et al. | |
| 2009/0018764 A1 | 1/2009 | Ishibashi et al. | |
| 2009/0024315 A1 | 1/2009 | Scheibe | |
| 2009/0150064 A1 | 6/2009 | Geelen | |
| 2009/0150349 A1 | 6/2009 | Cartin et al. | |
| 2009/0234574 A1 * | 9/2009 | Deng et al. | 701/201 |
| 2009/0306882 A1 | 12/2009 | Vijayakrishnan et al. | |
| 2010/0082241 A1 | 4/2010 | Trivedi | |
| 2010/0197524 A1 | 8/2010 | Janata et al. | |
| 2010/0305842 A1 | 12/2010 | Feng | |
| 2011/0106429 A1 | 5/2011 | Poppen et al. | |
| 2012/0046861 A1 | 2/2012 | Feldbauer | |
| 2012/0123678 A1 | 5/2012 | Poppen et al. | |
| 2012/0130638 A1 | 5/2012 | Uyama et al. | |
| 2012/0197524 A1 | 8/2012 | Beyeler et al. | |
| 2012/0197696 A1 * | 8/2012 | Beyeler et al. | G01C 21/3682 705/14.4 |
| 2012/0197714 A1 * | 8/2012 | Beyeler et al. | G01C 21/3682 705/14.49 |
| 2013/0138341 A1 | 5/2013 | Poppen et al. | |
| 2013/0166192 A1 | 6/2013 | Pfeifle et al. | |
| 2013/0275295 A1 | 10/2013 | Nesbitt | |
| 2014/0163873 A1 | 6/2014 | Beyeler et al. | |
| 2014/0278063 A1 | 9/2014 | Beyeler et al. | |

FOREIGN PATENT DOCUMENTS

| | | |
|---|---|---|
| JP | 2010-204831 | 9/2010 |
| WO | WO 2009/121299 A1 | 10/2009 |
| WO | WO 2010/040400 A1 | 4/2010 |

OTHER PUBLICATIONS

International Searching Authority Search Report mailed in PCT/US2012/023232, Sep. 11, 2012 (10 pages).

Search Report mailed in PCT/US 2012/022658, Apr. 12, 2012 (11 pages).

EPO Communication, issued for European Application No. 12 708 067.9-1557, mailed on Jun. 3, 2014 (7 pages).

* cited by examiner

SYSTEMS AND METHODS FOR GENERATING ELECTRONIC MAP DISPLAYS WITH POINTS-OF-INTEREST BASED ON DENSITY THRESHOLDS

CROSS REFERENCE TO RELATED APPLICATION(S)

This application is a continuation application of and claims priority to U.S. patent application Ser. No. 13/019,646, filed Feb. 2, 2011 (now allowed), which is incorporated herein by reference in its entirety.

BACKGROUND

1. Technical Field

The present disclosure generally relates to the field of computer processing and electronic map displays. More particularly, and without limitation, the present disclosure relates to computerized systems and methods for generating electronic map displays based on, for example, points-of-interest (POI) density, route distance, and/or distances of POIs from reference locations.

2. Background Information

Today, electronic map displays are widely used to convey information about roads, traffic, buildings, landmarks, terrain, etc., related to geographical regions of interest. Interactive maps may allow a user, for example, to access a map of a particular location (e.g., specific address, city, state, country, etc.) and the surrounding locations. After accessing a location, a user may navigate around the location by zooming in and out, and scrolling left, right, up, and down on the map. A user may also use the map to retrieve directions/routes between two or more locations. Because of their versatility, electronic map displays are used in a variety of different computer systems and applications. For example, electronic map displays are used in personal navigation devices to convey driving and/or walking directions to the user. In addition, electronic map interfaces are available from a variety of Internet resources (e.g., www.mapquest.com) for use by the public.

Interactive maps may also provide information about various POIs near a location selected or specified by a user. A POI may be, for example, a specific entity or attraction that is useful or interesting to an individual or a group of individuals, or that the individual or the group may want to visit. By way of example, POIs on a map display may represent gas stations, rest areas, hotels, restaurants, museums, hospitals, historical sites in a specific geographic area, houses for sale, etc. A POI may also correspond to a movie theater showing a particular film, a restaurant that serves a specific type of food, such as pizza, etc.

A user may search for specific POIs that the user wants to locate by entering information for a query. Search results for identified POIs may be provided to a user based on the query. The search results may be within either search boundaries set by an arbitrary radius (e.g., 1 mile, 5 miles, 10 miles, etc.) from a location, a geographic region (e.g., neighborhood, city, etc.) defined by a polygon, or an arbitrary polygon (e.g., square, etc.) surrounding a location. As a result, POIs that are outside a search boundary are not provided to the user. In addition, a user is denied the opportunity to consider POIs that might better fit the user's preferences based on the query and/or based on the route on which the user is driving. At the same time, when a user expands the geographic scope of search results, a user is often provided with an electronic map display that is crowded with too many POIs that are unappealing to the user.

Further, as the number of POIs represented increases, electronic map displays may become cluttered and difficult to read. For example, if a user searches for "pizza" in New York City, the number of POI icons shown on the map display may be quite large, rendering the map display unwieldy and difficult to read. At the same time, some POI icons may overlap one another, hiding some information that may be of interest to the user. In contrast, when searching for POIs within rural areas or along routes of great distance, conventional map displays may determine that no POIs are available within the search boundaries and/or may display POIs that may require the user to take a long detour away from the route, causing inconvenience to the user.

In view of the foregoing, there is a need for improved techniques for generating electronic map displays. Preferably, such techniques should be more efficient, while also providing relevant or useful search results in comparison to that provided by conventional methods. Moreover, there is a need for improved methods and systems for providing search results of relevant POIs in response to a query from a user that are not necessarily limited to search boundaries and account for POI density, the distance of the route, and distances of POIs from reference locations along the route.

SUMMARY

Consistent with the present disclosure, computerized systems and methods are provided for generating electronic map displays for users. Embodiments of the present disclosure are also provided for identifying and presenting electronic map displays with POI information. Moreover, in accordance with certain embodiments, computerized systems and methods are provided for generating electronic map displays based on, for example, POI density, route distance, and/or distances of POIs from reference locations.

In accordance with one exemplary embodiment, a computer-implemented method for generating an electronic map display is provided. The method comprises determining a route distance based on information for a route; comparing the route distance with a distance threshold; defining a search area when the route distance is less than the distance threshold, the search area including boundaries; calculating, using a processor, a points of interest (POI) density of the search area; comparing the POI density with a first density threshold and a second density threshold; adjusting the boundaries of the search area based on a result of comparing the POI density with the first density threshold and the second density threshold; identifying POIs in the adjusted search area; and providing POI information for an electronic map display, the POI information being associated with one or more POIs identified in the adjusted search area.

In accordance with another exemplary embodiment, a system for generating an electronic map display is provided. The system comprises an input device for receiving input from a user; a display device for displaying the electronic map display; a processor configured to determine a route distance based on information for a route, compare the route distance with a distance threshold, define a search area when the route distance is less than the distance threshold, the search area including boundaries, calculate a points of interest (POI) density of the search area, compare the POI density with a first density threshold and a second density threshold, adjust the boundaries of the search area based on a result of comparing the POI density with the first density threshold and the second density threshold, identify POIs in the adjusted search area, and provide POI information for an electronic map display, the POI information being associated with one or more POIs identified in the adjusted search area Consistent with another exemplary embodiment, there is provided a computer-readable storage medium storing a program, which, when executed by a computer, causes the computer to perform a method for generating an electronic map display. The method comprises determining a route distance based on information for a route; comparing the route distance with a distance threshold; defining a search area when the route distance is less than the distance threshold, the search area including boundaries; calculating a points of interest (POI) density of the search area; comparing the POI density with a first density threshold and a second density threshold; adjusting the boundaries of the search area based on a result of comparing the POI density with the first density threshold and the second density threshold; identifying POIs in the adjusted search area; and providing POI information for an electronic map display, the POI information being associated with one or more POIs identified in the adjusted search area.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
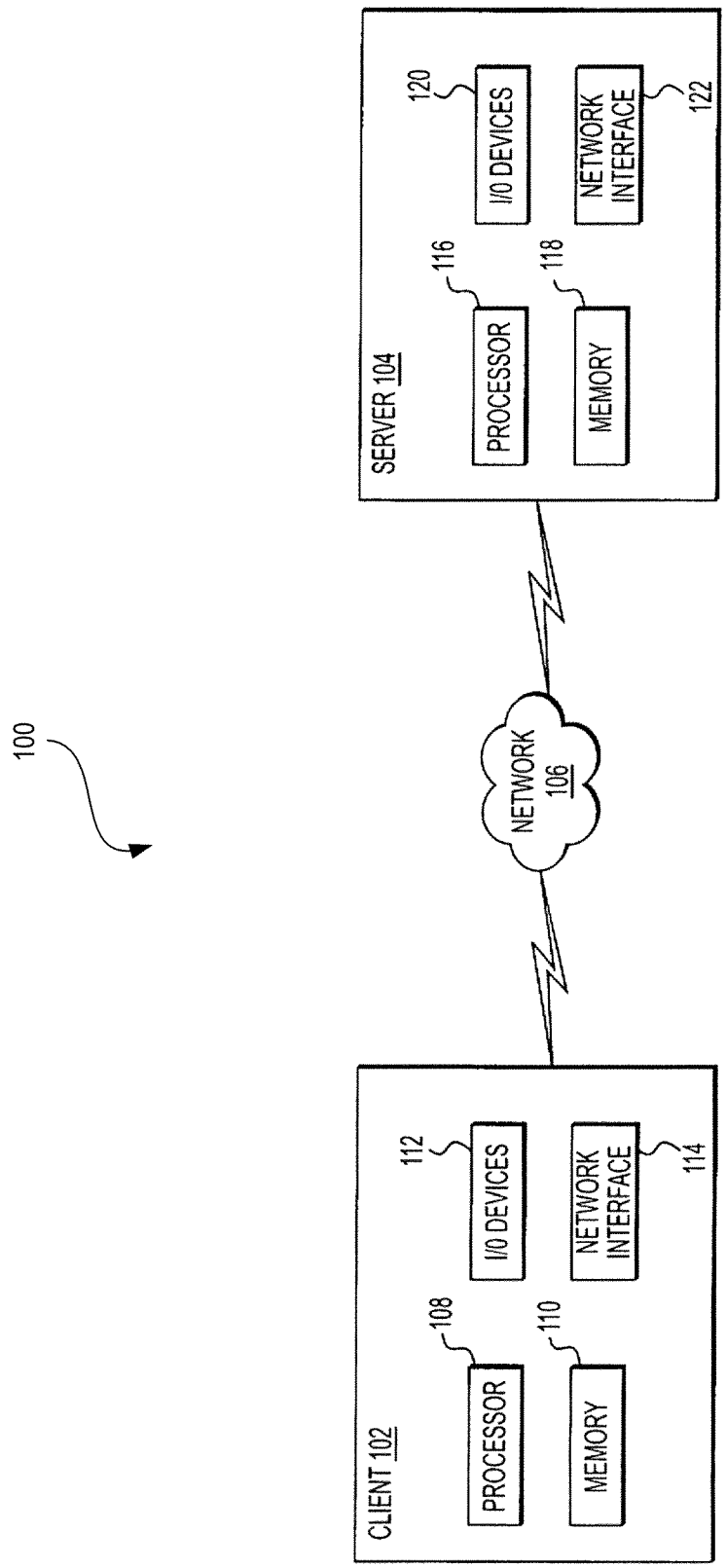
FIG. 1 is a representation of an exemplary system for generating and providing electronic maps, consistent with embodiments of the present disclosure.

FIG. 1 is a representation of an exemplary electronic map system 100, consistent with embodiments of the present disclosure. As shown in FIG. 1, electronic map system 100 may include a client 102 and a server 104 connected via a network 106. Although only one client 102 and one server 104 are illustrated in FIG. 1, it will be appreciated that other components may be included in system 100, including a plurality of clients 102 and a plurality of servers 104, which communicate via network 106, alone and/or in combination with other networks.

By way of example, client 102 may comprise a personal computer (PC), a hand-held computer, a personal digital assistant (PDA), a portable navigation device, a mobile phone, and/or any other computing device known in the art. Client 102 may include a processor 108, a memory 110, one or more input/output (I/O) devices 112, and a network interface 114 for communicating with other components via network 106.

Processor 108 may comprise one or more processors (e.g., a CPU) configured to execute instructions and to process data to perform one or more functions associated with electronic map system 100. For example, processor 108 may be configured to execute instructions to perform the exemplary methods or steps disclosed herein.

Memory 110 may comprise one or more memory devices that store data, such as, for example, random access memory (RAM), read-only memory (ROM), a magnetic storage device (e.g., a hard disk), an optical storage device (e.g., a CD- or DVD-ROM), an electronic storage device (e.g., EPROM or a flash drive), and/or any other data storage device known in the art. Memory 110 may store one or more applications for performing the exemplary methods or steps disclosed herein. Consistent with the present disclosure, the applications may be implemented using applets, plug-ins, modules, and/or any other suitable software components or set of instructions.

Figure 2:
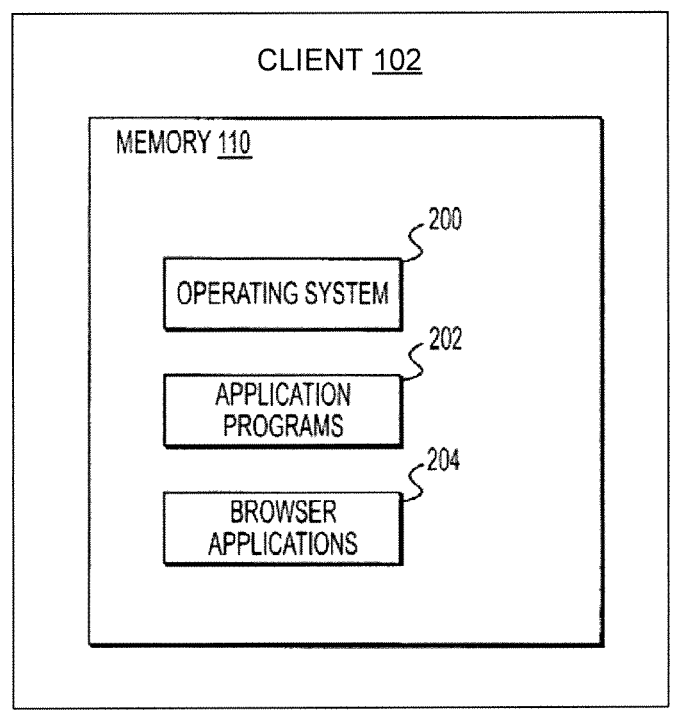
FIG. 2 is a representation of the components and information that may stored or otherwise associated with a client, consistent with embodiments of the present disclosure.

FIG. 2 illustrates exemplary components and information that may be stored in client memory 110 or otherwise associated with client 102, consistent with embodiments of the present disclosure. As shown in the example of FIG. 2, memory 110 may store an operating system 200, such as DOS, Windows, or Linux. Memory 110 may also include one or more application programs 202, such as word processing, database programs, spreadsheet programs, presentation programs, graphics programs, and/or other programs capable of generating documents or other electronic content. Memory 110 may also include browser applications 204 capable of rendering standard Internet content, such as Netscape Navigator, Microsoft Internet Explorer, Mozilla Firefox, and/or Safari. Processor 108 may leverage and execute operating system 200, application programs 202, and/or browser applications 204, including to support the exemplary methods or steps disclosed herein.

Referring back to FIG. 1, I/O devices 112 may include one or more components allowing a user of electronic map system 100 to interface with a plurality of clients, including client 102. For example, I/O devices 112 may include user input devices, such as a keyboard, a keypad, a mouse, a touch pad, a touch screen, a microphone, an accelerometer, and/or any other user input device known in the art. I/O devices 112 may also include output devices such as a display (e.g., an LCD, a CRT display, or a plasma display), a printer, a speaker, and/or any other suitable output device.

Network interface 114 may comprise any communication device for sending and receiving data. For example, network interface 114 may include a modem, a transceiver, a set-top box, a network communication card, a satellite dish, an antenna, and/or any other network adapter capable of transmitting and receiving data over network 106.

Server 104 may comprise a PC, a mainframe computer, and/or any other computing device known in the art. Similar to client 102, server 104 may include a processor 116, a memory 118, one or more I/O devices 120, and/or a network interface 122 for communicating with other components via network 106. As will be appreciated from this disclosure, one or more components of server 104 may be the same or similar to those discussed above in connection with client 102 and, accordingly, discussion thereof is omitted. Server 104 may respond to a request from client 102 received from network 106 in connection with the exemplary methods or steps disclosed herein.

Consistent with certain embodiments, server 104 may comprise a single server computer or a collection of server computers, alone or in combination with other components, such as a global positioning system (GPS) (not shown). For example, server 104 may be part of a distributed server network (not shown) and may distribute data for parallel processing to one or more additional servers on the distributed server network. As a further example, server 104 comprises a server farm including a plurality of server computers and a load balancer for processing communications and handling requests from a plurality of clients.

Figure 3:
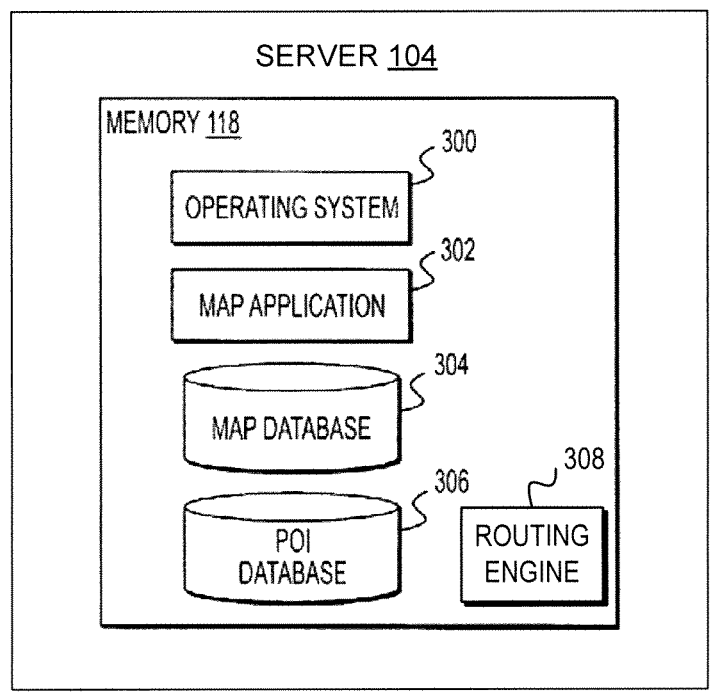
FIG. 3 is a representation of the components and information that may be store or otherwise associated with a server, consistent with embodiments of the present disclosure.

FIG. 3 illustrates exemplary components and information that may be stored in server memory 118 or otherwise associated with server 104, consistent with embodiments of the present disclosure. As shown in FIG. 3, memory 118 may include an operating system 300, a map application 302, a map database 304, a POI database 306, and a routing engine 308.

Map application 302 may comprise one or more electronic mapping applications configured to render map displays based on stored map data and user input. Map database 304 may contain cartographic information, geographic information, road information, satellite image information, traffic information, maneuver lists, and/or other information about one or more geographical regions of interest. POI database 306 may contain address information, latitude/longitude information, ID numbers, website addresses, descriptive information, and/or other information about various POIs within the geographical regions of interest. POI database 306 may also include optimization criteria that may be used to locate POIs and/or POI information. The optimization criteria may include user preferences, predetermined thresholds, density parameters, reference locations, and/or other information that may be used to provide POIs and/or POI information based on relevant factors such as distance of a specific route, POI density within a particular search region, and/or relative distances of POIs from a reference location.

Routing engine 308 may be used to generate routes, to perform analysis on segments of generated routes, and/or to provide a user with information corresponding to POIs along a particular route. For example, routing engine 308 may request map application 302 to provide relevant information from map database 304 and POI database 306 to generate a particular route. Alternatively, or additionally, routing engine 308 may retrieve the relevant information directly from map database 304 and/or POI database 306. Processor 116 may leverage and execute operating system 300, map application 302, map database 304, POI database 306, and/or routing engine 308 in connection with, for example, the methods and steps disclosed herein.

Figure 4:
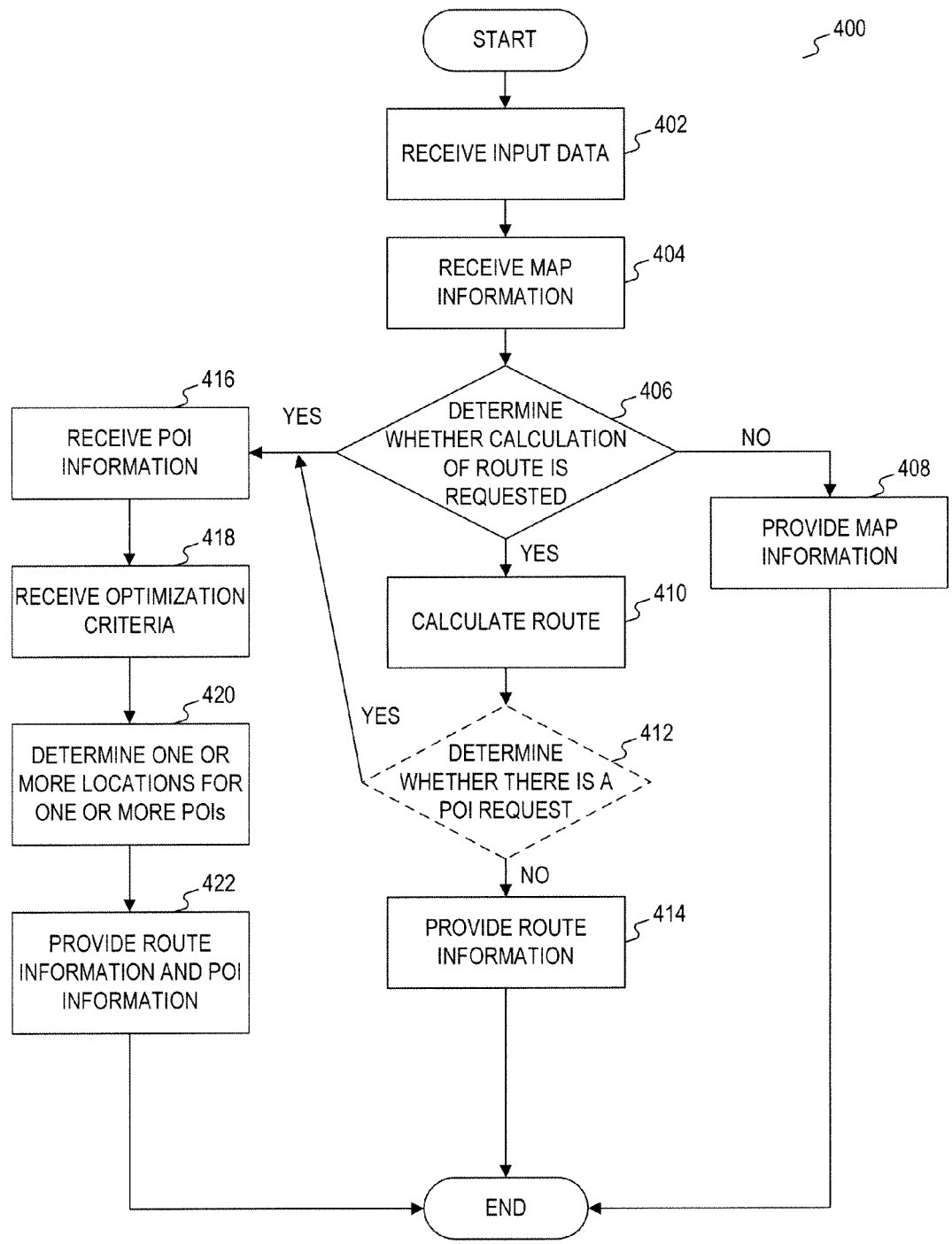
FIG. 4 is a flowchart depicting an exemplary method for generating an electronic map display, consistent with embodiments of the present disclosure.

FIG. 4 is a flowchart depicting an exemplary method 400 for generating an electronic map display, consistent with embodiments of the present disclosure. Method 400 may be performed based on, for example, program modules stored in client memory 110 and/or server memory 118. Although method 400 is described below as being performed by server 104, it is to be appreciated that method 400 may be performed by server 104 and client 102, either individually or in combination. For example, client 102 may perform method 400 based on data provided by server 104, or server 104 may perform method 400 based on data provided by client 102. Alternatively, client 102 and server 104 may each perform different portions of method 400.

Referring to FIG. 4, in step 402, server 104 may receive input data from client 102. The input data may be entered by a user and may include a request for a map of a particular location, a request for a POI, a request for generating a route between an origination point and a destination point, a request for providing driving directions, a request for providing walking directions, and/or other requests associated with electronic map displays or information. For example, a user at client 102 may access a mapping application associated with server 104 by entering a domain name or uniform resource locator (URL) into a web browser application (e.g., www.mapquest.com). The user may then provide input data to request map information for a particular geographical region of interest by entering input data, such as a city name, an address, or other information, into the mapping application as a search key. Alternatively, or additionally, the user may request map information for a particular geographical region of interest by providing input directly to a map interface associated with the mapping application (e.g., zooming, panning, etc.).

In step 404, server 104 may receive map information to process the request based on the input data received in step 402. Map application 302 may retrieve relevant map information from, for example, map database 304. Next, in step 406, it is determined whether the input data received in step 402 includes a request for calculation of a route. The method proceeds to step 408 when calculation of a route is not requested (step 406: No) and a map display may be provided based on the map information. The map display may be provided to client 102 via network 106 and may also include graphical icons representing POIs within the map. The graphical icons (not shown) may be generated by map application 302 based on POI information retrieved from POI database 306. Client 102 and/or server 104 may display the map information as a map view or a portion of an overall map that is displayed and viewable to the user.

Alternatively, the method may proceed to step 410 when calculation of a route is requested (step 406: Yes) and a route may be calculated based on map information received in step 402. The route may be calculated by routing engine 308 and/or map application 302. In step 412, it is determined whether input data includes a request for POIs along the route. Alternatively, the request for POIs along the requested route may be received after generation of the route or triggered automatically.

The method proceeds to step 414 when a POI request is not received (step 412: No) and route information corresponding to the calculated route is provided. The route information may be provided to client 102 via network 106 and may include a map display, turn-by-turn directions, instructions to generate audio and/or graphical output as the user traverses through the calculated route, advertisement information associated with POIs along the route, and/or other information. The route information may include a combination of text and graphics that is displayed and viewable to the user. Further, depending on a preference of a user included in POI database 306, routing engine 308 may refine and/or format the route information before providing it to client 102. For example, POI database 306 may indicate that a particular user is hearing impaired and/or may have additional disabilities that may require the routing instructions to be delivered in a specific format governed by regulations and/or other technological limitations of a user's device. As is indicated in FIG. 4, steps 412 and 414 may be optional and process 400 may move directly from step 410 to 416, such that POI information may be automatically provided with route information without determining whether a POI request was received.

Alternatively, the method may proceed to step 416 when a request for a POI is received (step 412: Yes) and server 104 may receive POI information for locations along the route. For example, the user may enter a search key (e.g., "Holiday Inn," "pizza," etc.) into a search interface provided by the mapping application. Map application 302 may then search POI database 306 based on the search key and may retrieve POI information (e.g., latitude and longitude information, name, address, icon graphic information, etc.) corresponding to each of the POIs identified by the search that are located along the calculated route. Map application 302 may provide the POI information to routing engine 308 for determination of a suitable POI along the calculated route.

Next, in step 418, optimization criteria may be received. The optimization criteria may be retrieved from POI database 306 by map application 302 and may be provided to routing engine 308 or may be retrieved directly by routing engine 308. The optimization criteria may include user preferences, predetermined thresholds, density parameters, reference locations, and/or other information that may be used to provide suitable POIs based on relevant factors such as distance of the calculated route, POI density within a particular search region along the calculated route, and/or relative distances of POIs from a reference location along the calculated route.

In step 420, locations of one or more POIs may be determined based on the calculated route, the POI information, and/or the optimization criteria. As will be explained in detail below with respect to FIGS. 5-7, routing engine 308 may perform various processing tasks to determine locations of POIs along a calculated route. For example, routing engine 308 may divide the calculated route into segments of equal or varying distances and may calculate a POI density for each segment. Routing engine 308 may compare the POI density with a threshold density and, depending on a result of the comparison, may increase or decrease the search radius along a particular segment to search for a POI. In addition, after dividing the calculated route into segments of equal or varying distances, routing engine 308 may search for groups of POIs for each segment and may determine the density of each group to provide the user with a location having, for example, multiple POIs in close proximity to each other along the route. Further, routing engine 308 may determine reference points along the route, such as rest areas and/or exits along an interstate, and search for POIs nearest to the reference points.

Next, in step 422, route information and POI information may be provided and processing may end. As part of this step, a electronic map display may be generated that includes the POI information. In accordance with one embodiment, server 104 may provide route information and POI information to client 102 via network 106, whereby the information is provided as part of control signals or instructions for rendering an electronic map display. Server 104 may also provide client 102 with, for example, turn-by-turn directions, instructions to generate audio and/or graphical output as the user traverses through the calculated route, advertisement information associated with POIs along the route, locations of POIs along the route, distances of POIs from reference points along the route, ranks of POIs based on matches with search criteria and user preferences, and/or other suitable information. The route information and POI information may include a combination of text and graphics that is displayed and viewable to the user. Further, as explained above, routing engine 308 may refine and/or format the route information and POI information before providing it to client 102.

Figure 5:
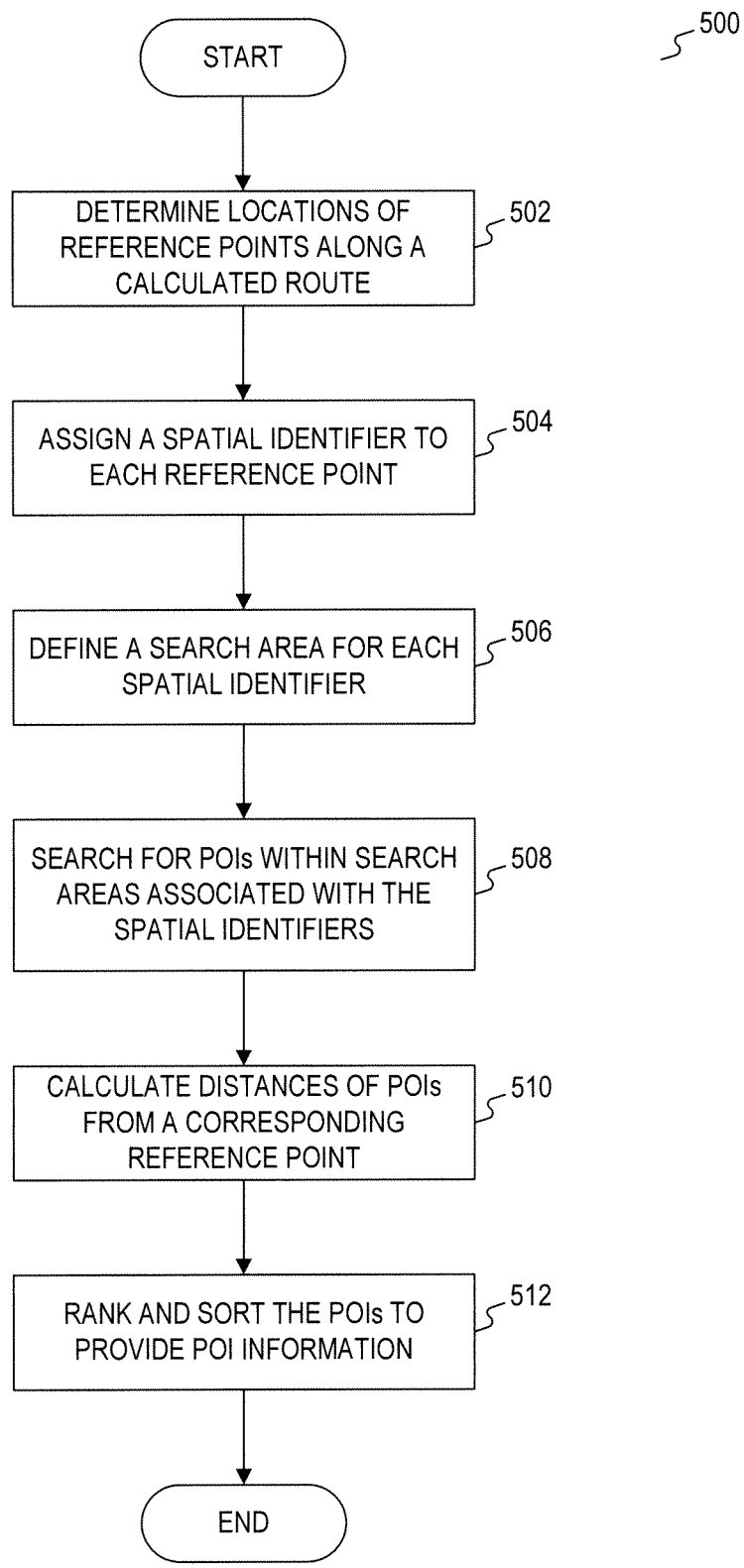
FIG. 5 is a flowchart depicting an exemplary method for determining a POI based on a reference point, consistent with embodiments of the present disclosure.

FIG. 5 is a flowchart depicting an exemplary method 500 for determining a POI based on a reference point, consistent with embodiments of the present disclosure. As will be appreciated, the exemplary method 500 may be implemented as part of step 420 of method 400 (FIG. 4). Initially, in step 502, server 104 may determine locations of reference points along a calculated route. The reference points may be determined by routing engine 308 based on information retrieved from map database 304 and/or POI database 306. By way of example, the reference points may correspond to exits along an interstate, highway, freeway, and/or similar roadway. Reference points may also correspond to rest areas along a calculated route, any location manually identified by a user, and/or shape points included in the route. Shape points may correspond to maneuver points included in a maneuver list, stored in map database 304, that provides a list of predetermined location points where a vehicle is instructed to proceed in a certain direction along the calculate route. Each shape point includes a latitudinal and longitudinal value identifying its location with respect to its physical location on the surface of the earth. The number of shape points and the position of shape points may determine the geographic condition of the path being navigated.

In step 504, a spatial identifier may be assigned to each reference point. To define spatial identifiers, routing engine 308 may first determine a latitude and a longitude of a particular reference point and may determine the significance of the reference point. For example, an entity such as "Grand Canyon" may have a high (global) significance, and a local gas station may have a low (localized) significance. A high significance may mean that the reference point should be identified on a wide geographic scope, and a low significance may mean that the reference point has a localized scope.

Next, in step 506, a search area may be defined for each spatial identifier identified in step 504. The search area may be defined by routing engine 308 and may correspond to a polygon whose boundaries are drawn around a reference point. A polygon with large boundaries may be defined to search for a POI around a reference point having a spatial identifier with high significance, and a polygon with smaller boundaries may be defined to search for a POI around a reference point having a spatial identifier with low significance.

In step 508, a search may be conducted for POIs within the search areas associated with the spatial identifiers. In step 508, the search area may be increased or decreased when a high number of POIs or no POIs are found within the search areas associated with the spatial identifiers. Further, and as will be explained below with reference to the example of FIG. 6, the search area may be adjusted based on a comparison between a density of a particular search area with a predetermined density threshold.

Next, in step 510, distances of POIs found in step 508 may be calculated from corresponding reference points, and the POIs may be ranked and sorted to provide suitable POI information (step 512). The distances of POIs may be calculated by routing engine 308 and/or map application 302 by using map information and POI information retrieved from map database 304 and POI database 306, respectively.

Routing engine 308 may rank and sort the POIs associated with each area based on a plurality of factors that may be assigned different weights to calculate the ranks. For example, a POI may be determined to be the most suitable POI and may be assigned the highest rank when the distance between it and the reference point is shortest compared to distances between the reference point and other POIs. Further, a POI may be determined to be the most suitable POI and may be assigned the highest rank when the driving duration between it and the reference point is determined to be smallest compared to durations between the reference point and other POIs. Additional factors may include one or more of the levels of matches with the search criteria provided by a user, preferences of users included in optimization criteria, quality of POIs that may be determined based on information gathered from public sources (e.g., quality of restaurant, cleanliness of rest area, pet friendly location, healthy food options, or price of gas), types of POIs requested by a user, and/or any other relevant factors.

Figure 6:
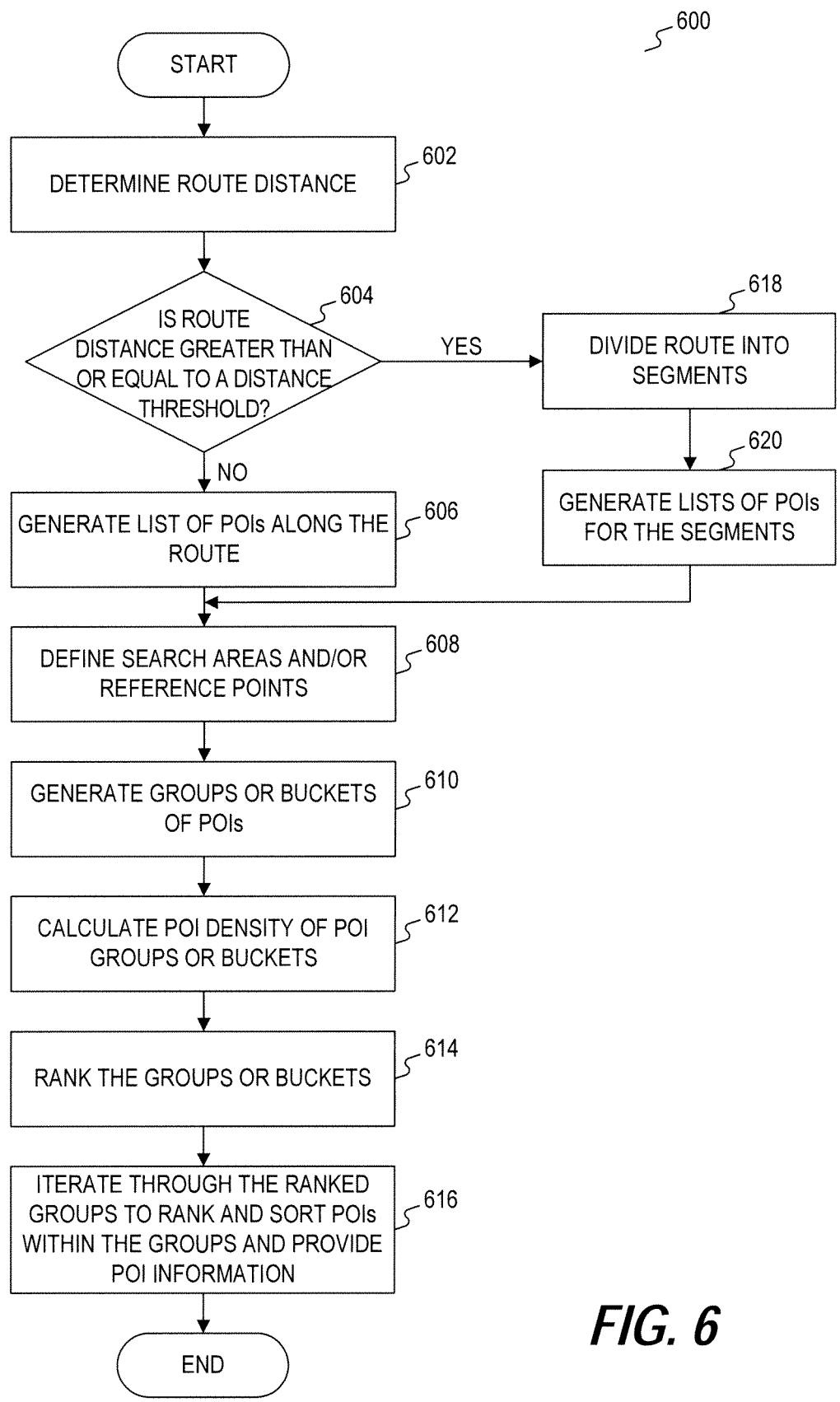
FIG. 6 is a flowchart depicting an exemplary method for determining a POI based on a route distance and POI density of locations along a route, consistent with embodiments of the present disclosure.

FIG. 6 is a flowchart depicting an exemplary method 600 for determining a suitable POI based on route distance and POI density of locations along the route, consistent with embodiments of the present disclosure. As will be appreciated, the exemplary method 600 may be implemented as part of step 420 of method 400 (FIG. 4). Initially, in step 602, server 104 may determine a total distance of the route calculated in step 410 of method 400. The route distance may be calculated by routing engine 308 based on map information retrieved from map database 304. In step 604, it may be determined whether the route distance is greater than or equal to a distance threshold. The distance threshold may be a predetermined value retrieved from optimization criteria and/or may be a value that is dynamically generated by routing engine 308 or manually provided by a user. For example, I/O devices 120 of server 104 may display a screen including clickable options and/or prompt a user to select whether the route distance should be used as a factor to determine the location of POIs.

The method proceeds to step 606, when the route distance is not greater than or equal to the distance threshold (step 604: No), and a list of POIs along the route is generated. The list of POIs may be generated by routing engine 308 based on POI information received from POI database 306 in step 416 of method 400 and/or may be dynamically generated by performing real-time searches. The distance threshold may be retrieved from optimization criteria or may be generated dynamically. In step 608, reference points and/or search areas may be defined along the route. The reference points and/or search areas may be defined by using the same or similar processes as described above with respect to method 500. Next, in step 610, the list of POIs may be used to generate various groups or buckets of POIs. All POIs that are determined to be located within a particular search area may be grouped together and placed in a single bucket. Alternatively, or additionally, all POIs that are at a predetermined distance from a reference point and/or at a predetermined distance from each other may be grouped together and placed in a single bucket. The predetermined distance may be retrieved from optimization criteria.

In step 612, POI density of each POI group or bucket may be calculated. The POI density may be calculated by determining the number of POIs in each group or bucket, and/or other factors such as the proximity of the POIs in a group from each other and/or the distance of the POIs in a group from a reference point. In step 614, the groups or buckets of POIs may be ranked based on various factors. For example, the density of each POI bucket may be compared to a density threshold and the POI bucket having the highest differential may be ranked the highest. Further, the POI bucket having the greatest number of POIs of a particular type or category may be ranked the highest. For example, if the user is searching for restaurants, the POI bucket having the highest number of restaurants may be ranked the highest. Additional factors, such as safety of the location, reviews of POIs retrieved from public sources, service area time of restaurants, diversity of POIs (e.g., repair shops, restaurants, gas stations, shopping malls, and other commercial locations) within one group, accessibility from major freeways, traffic conditions, and/or other suitable factors, may be used to rank the groups or buckets.

In addition, user criteria and/or a predetermined threshold may be used to limit further consideration of POI buckets. For example, when multiple POI buckets are highly ranked in step 614, routing engine 308 may select only the top three or four ranked POI buckets for further processing and may disregard the remaining POI buckets. A cut-off level for POI buckets may be used based on user criteria and/or a predetermined threshold. Similarly, a high number of POI buckets having POIs of a particular type may be displayed along with a low number of POI buckets having POIs of a different type. For example, if a user searched for Italian food, routing engine 308 may determine that ten POI buckets have a rank that have a POI density greater than density threshold. Out of the ten POI buckets, there may be four POI buckets that may include multiple Italian restaurants, while there may be two POI buckets that may include restaurants that do not serve Italian food. Routing engine 308 may select three out of the four POI buckets having multiple Italian restaurants and may select one out of the two POI buckets that include restaurants that do not serve Italian food to limit processing time and to provide the user with diverse results.

Next, in step 616, POIs within the ranked groups or buckets may be ranked and sorted to provide suitable POI information. Routing engine 308 may iterate through the ranked groups in an order based on the ranking of the groups. For example, the POIs included in the highest ranked group or bucket may be ranked first based on a plurality of factors that may be assigned different weights as explained above with respect to method 500. Suitable POI information may be provided in a sequential order as the POIs are being ranked for each bucket or the suitable information may be sent after the POIs in all the buckets have been ranked. The POIs may be ranked by using similar techniques as described above with respect to the ranking of POI buckets. For example, only a select number of POIs may be displayed that may be less than a selected user criteria and/or a predetermined threshold.

In addition, only a limited number of POIs may be selected based on the significance of the type of POI that may have been requested by a user. For example, a user may be searching for a gas station or a hospital, and it may not be important to provide the user with different options of gas stations or hospitals. Routing engine 308 may select a POI that may correspond to the highest ranked gas station or hospital. Alternatively, if a user is searching for a restaurant, it may be important to provide the user with multiple options and routing engine 308 may select three POIs that may correspond to the three highest ranked restaurants.

Returning now to step 604, the method may proceed to step 618, when the route distance is greater than or equal to the distance threshold (step 604: Yes). In step 618, the route may be divided into segments of equal or varying distances. The route may be divided into smaller segments by routing engine 308 to allow for quicker processing of data while searching for a suitable POI. For example, a user may be driving along a route of 600 miles and may request a POI at a distance halfway through the route. Routing engine 308 would divide the route into 30 segments of 20 miles and would start processing POI information corresponding to the 20-mile segments near the current location of the route.

Next, in step 620, lists of POIs may be generated for each segment and/or for the most relevant segment. After the lists of POIs are generated for the segments, steps 608 to 616 may be repeated for the segments. For example, groups or buckets of POIs may be generated for various segments and the groups may be ranked to determine the highest ranked group in a particular segment. Similarly, POIs within a particular group in a segment may be ranked to provide suitable POI information.

Figure 7:
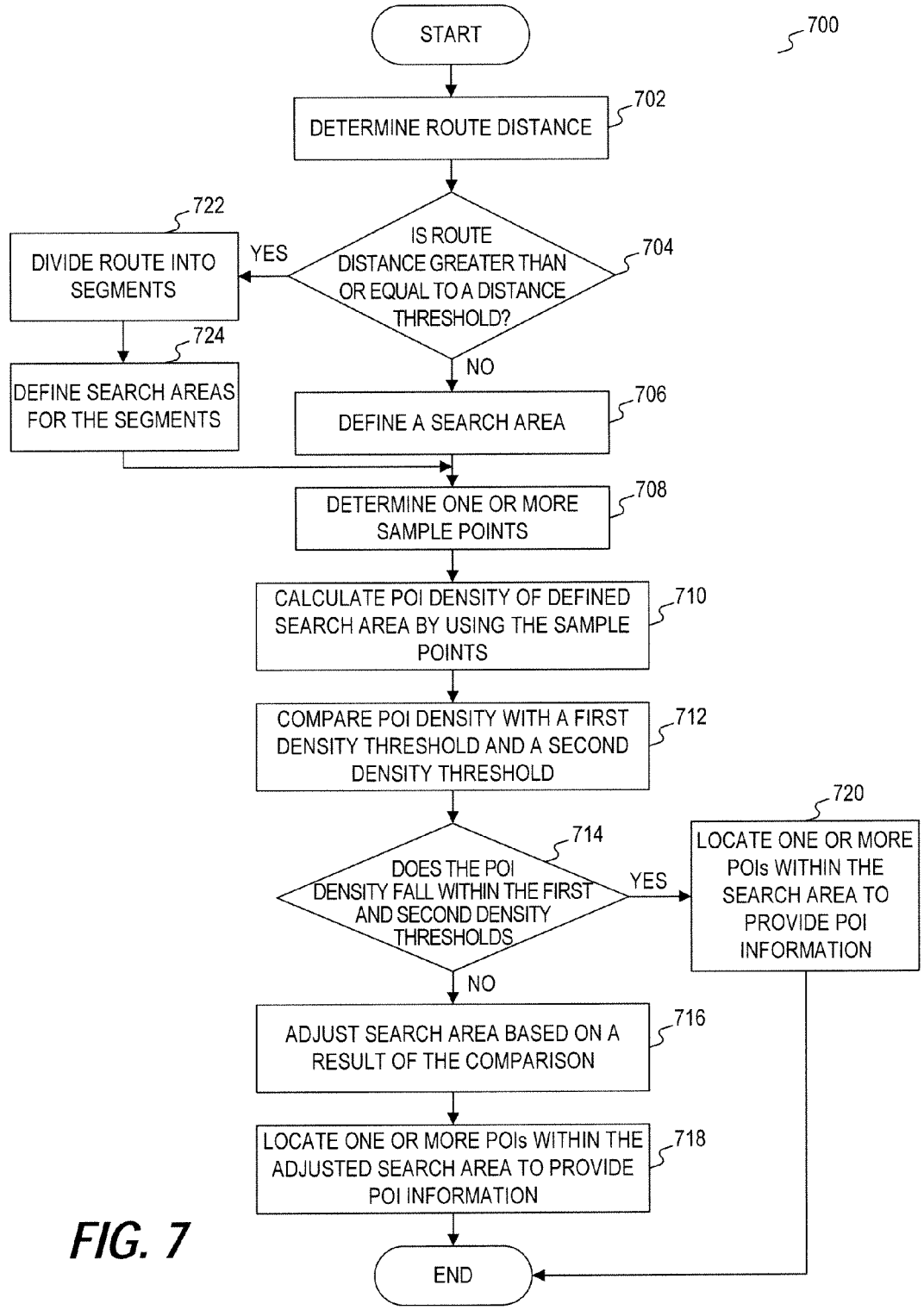
FIG. 7 is a flowchart depicting an exemplary method for adjusting search areas to determine a POI based on POI density of locations along the route, consistent with embodiments of the present disclosure.

FIG. 7 is a flowchart depicting an exemplary method 700 for adjusting search areas to determine a suitable POI based on POI density of locations along the route, consistent with the disclosed embodiments. As will be appreciated, the exemplary method 700 may be implemented as part of step 420 of method 400 (FIG. 4). Initially, in step 702, server 104 may determine a total distance of the route calculated in step 410 of method 400. The route distance may be calculated by routing engine 308 based on map information retrieved from map database 304. In step 704, it may be determined whether the route distance is greater than or equal to a distance threshold. Step 704 may be performed by using the same or similar process performed in step 604 of method 600.

The method proceeds to step 706, when the route distance is not greater than or equal to the distance threshold (step 704: No), and a search area may be defined along the route. The search area may be defined by using the same or similar processes as described above with respect to method 500 and to perform localized searches to locate POIs along the route. In step 708, one or more sample points may be determined in the search area defined in step 706. The sample points may be determined based on similar techniques used to locate reference points in method 500. In step 710, the POI density of the defined search area may be calculated based on the sample points. The POI density may be compared to a first density threshold and a second density threshold (step 712). The first and second density thresholds may be retrieved from the optimization criteria and/or may be generated dynamically. The first density threshold may represent a sparse area and the second density threshold may represent a dense area. For example, a sparse area may have very few or no POIs, such as rural South Dakota, and a dense area may have a high number of POIs, such as Washington, D.C.

In step 714, it is determined whether the POI density falls within the first and second density thresholds. The POI density may be determined to fall within the first and second density thresholds when the POI density is greater than the first density threshold and less than the second density threshold. The method proceeds to step 716, when the POI density does not fall within the range (step 714: No), and the search area defined in step 706 may be adjusted based on a result of the comparison. For example, boundaries of the search area may be increased when the POI density is determined to be less than or equal to the first density threshold. The boundaries are expanded because the comparison performed in step 712 may indicate that the defined search area is in a sparse area, and a greater area must be searched to provide suitable POI information. Further, the boundaries of the search area may be decreased when the POI density is determined to be greater than or equal to the second density threshold. The boundaries are decreased because the comparison performed in step 712 may indicate that the defined search area is in a dense area, and a smaller area must be searched to provide suitable POI information.

In step 718, one or more POIs may be located within the adjusted search area to provide suitable POI information. Step 718 may include the techniques described above with respect to methods 500 and 600. For example, the POIs may be grouped in buckets and/or may be ranked based on distances from a reference point.

Alternatively, the method proceeds to step 720, when the POI density falls within the range (step 714: Yes), and one or more POIs may be located within the search area defined in step 706. The POIs are located within the search area to provide suitable POI information.

Returning now to step 704, the method may proceed to step 722, when the route distance is greater than or equal to the distance threshold (step 704: Yes). In step 722, the route may be divided into segments of equal or varying distances. The route may be divided into smaller segments by routing engine 308 to allow for quicker processing of data while searching for a suitable POI. Next, in step 724, search areas may be defined for each segment and/or for the most relevant segment of the route. After the search areas are defined for the segments, steps 708 to 720 may be repeated for the segments. For example, POI densities may be calculated for search areas within each segment, and boundaries of the search areas may be adjusted based on comparison of the POI densities with the first and second density thresholds.

By implementing embodiments of the present disclosure, POIs are located and displayed on electronic map displays in a quick and efficient manner. Further, additional factors, such as POI density of particular areas, route distance, and/or user preferences, may be used to locate POIs that are most suitable or relevant to the needs of the user.

Figure 8:
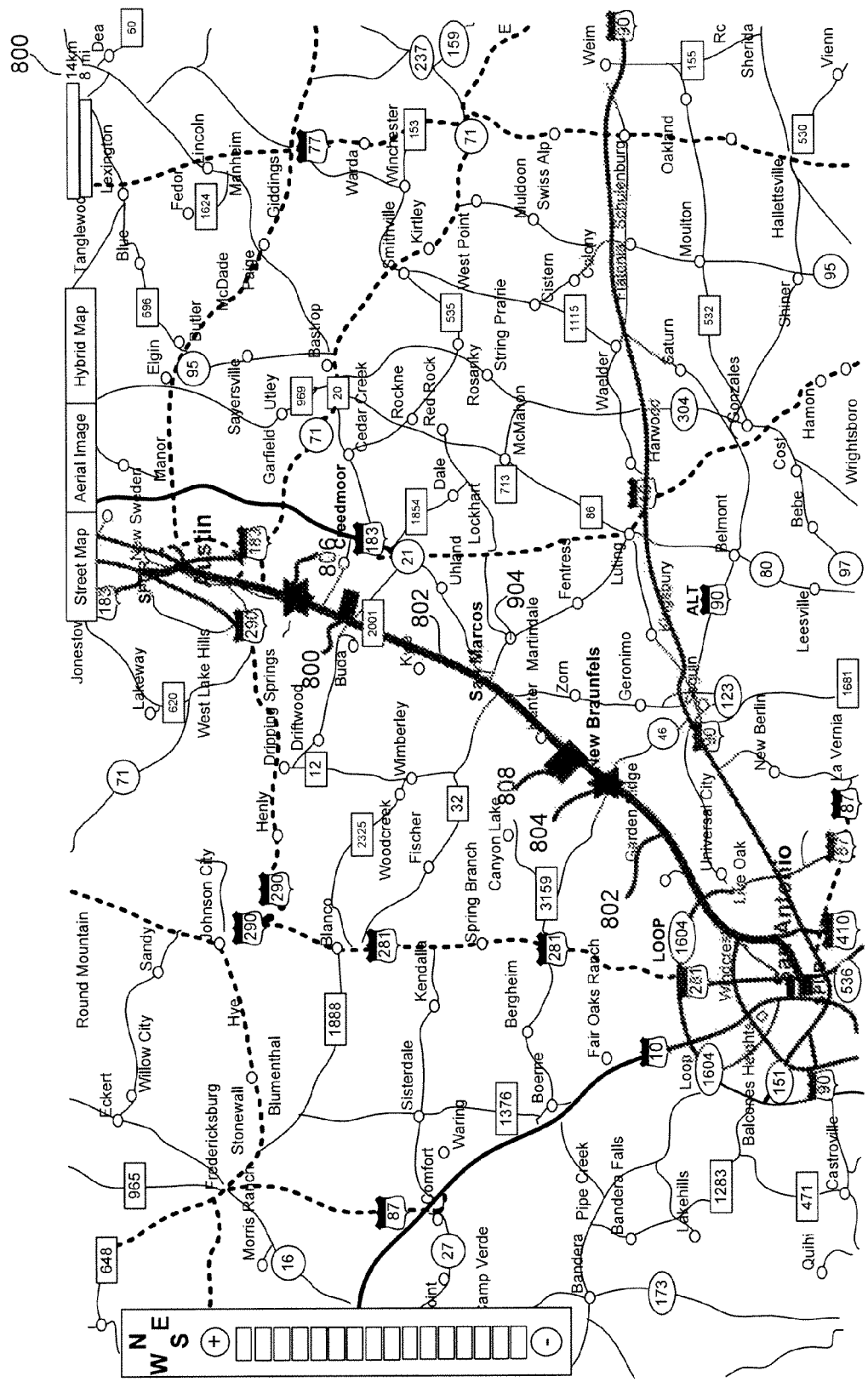
FIG. 8 is a representation of an exemplary electronic map display including POIs based on a reference point, consistent with embodiments of the present disclosure.

FIG. 8 is a representation of an exemplary electronic map display 800, consistent with embodiments of the present disclosure. Electronic map display 800 may be displayed on, for example, input/output (I/O) devices 112 of electronic map system 100. Electronic map display 800 may display a representation of a route 802 and POIs 804 and 806. POI 804 may be displayed when, for example, a user requests location information corresponding to a POI while the user is traveling along route 802. POI 804 may be determined to be a suitable POI as it may be determined to be at a dose distance from reference point 808. Similarly, POI 806 may be determined to be a suitable POI as it may be determined to be at a close distance from reference point 810. POIs 804 and 806 may be located after adjusting search areas (not shown) along route 802 by, for example, implementing exemplary process 700. Reference points 808 and 810 may represent locations of exits and/or rest areas along route 802 and may not be included in electronic map display 800.

Figure 9:
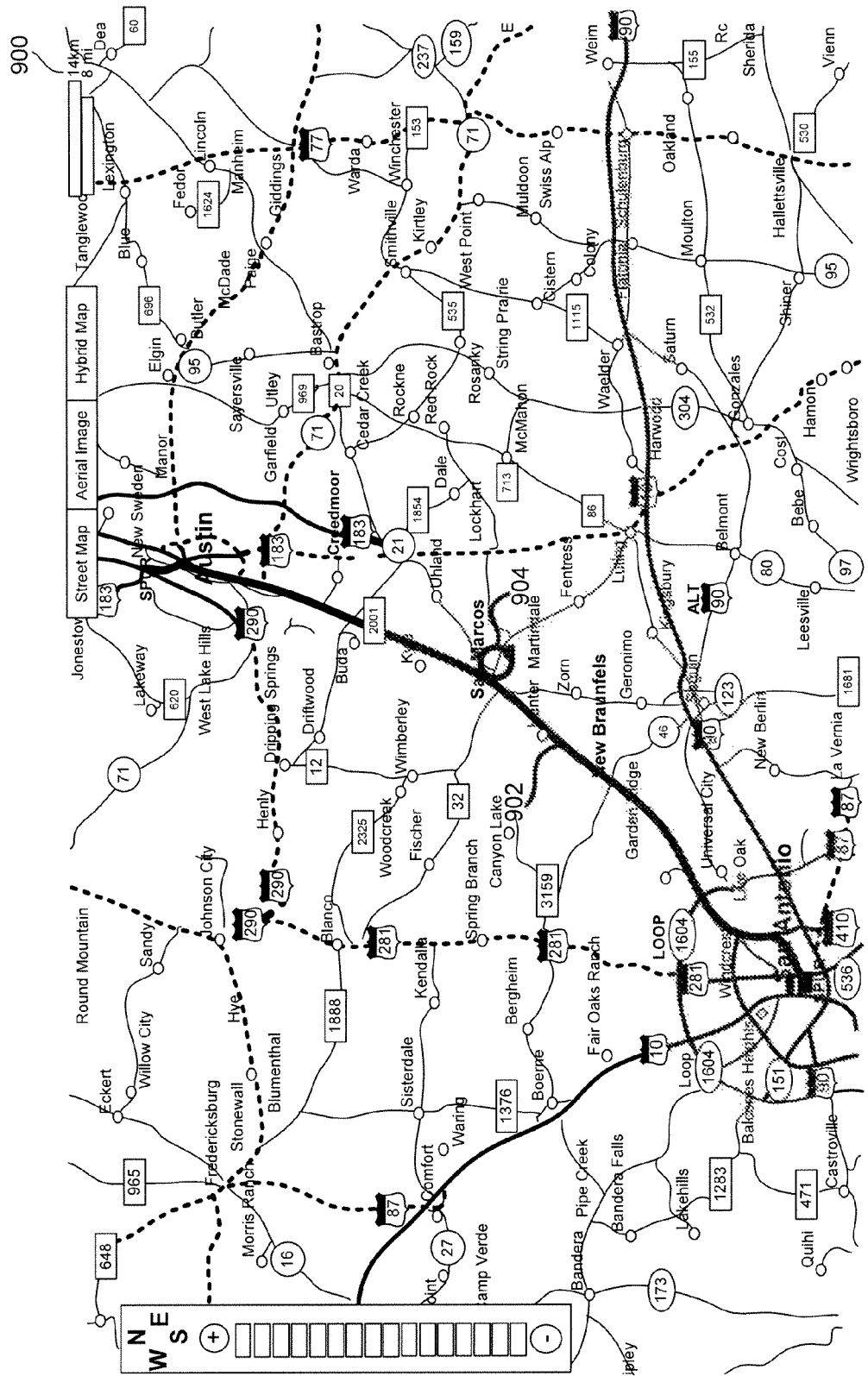
FIG. 9 is a representation of an exemplary electronic map display including POIs based on an adjusted search area and POI density, consistent with embodiments of the present disclosure.

FIG. 9 is a representation of an exemplary electronic map display 900, consistent with embodiments of the present disclosure. Electronic map display 900 may be displayed on, for example, input/output (I/O) devices 112 of electronic map system 100. Electronic map display 900 may display a representation of a route 902 and a cluster 904 along route 902. Cluster 904 may be displayed when a user searches for POIs while traveling along route 904 and may represent a location having a high POI density. For example, as is described above with respect to exemplary process 600, cluster 904 may correspond to a highest ranked group or bucket along route 902. Cluster 904 may include multiple POIs that may match a user requested criteria. For example, cluster 904 may include multiple restaurants serving a particular type of food. Cluster 904 may be located after adjusting search areas (not shown) along route 902 by, for example, implementing exemplary process 700.

One skilled in the art will appreciate that computer programs for implementing the disclosure may be stored on and/or read from computer-readable storage media. The computer-readable storage media may have stored thereon computer-executable instructions which, when executed by a computer, cause the computer to perform, among other things, the processes disclosed herein. Exemplary computer-readable storage media may include magnetic storage devices, such as a hard disk, a floppy disk, magnetic tape, or any other magnetic storage device known in the art; optical storage devices, such as CD-ROM, DVD-ROM, or any other optical storage device known in the art; and/or electronic storage devices, such as EPROM, a flash drive, or any other integrated circuit storage device known in the art. The computer-readable storage media may be embodied by or in one or more components of electronic map system 100 (FIG. 1).

One skilled in the art will further realize that the processes illustrated in this description may be implemented in a variety of ways and may include multiple other modules, programs, applications, scripts, processes, threads, or code sections that may all functionally interrelate to accomplish the individual tasks described above. For example, techniques described in FIG. 5 may be used in combination with techniques described in FIGS. 6 and 7. Further, it is contemplated that these program modules may be implemented using commercially available software tools, using custom object-oriented code written in the C++ programming language, using applets written in the Java programming language, or may be implemented as discrete electrical components or as one or more hard-wired application-specific integrated circuits (ASICs) custom designed for this purpose. In addition, the disclosure may be implemented in a variety of different data communication network environments and may use software, hardware, or a combination of hardware and software to provide the disclosed functions.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. It is intended that the specification and examples be considered as exemplary only, with a true scope and spirit of the invention being indicated by the following claims.

What is claimed is:

1. A computer-implemented method for adjusting search areas, the method comprising the following operations performed by at least one processor:
   determining a route distance based on information for a route;
   comparing the route distance with a distance threshold;
   defining a search area when the route distance is less than the distance threshold, the search area including boundaries;
   calculating a points of interest (POI) density of the search area;
   determining if the POI density is greater than a first density threshold and less than a second density threshold;
   increasing the boundaries of the search area when it is determined that the POI density is less than the first density threshold; and
   decreasing the boundaries of the search area when it is determined that the POI density is greater than the second density threshold.

2. The computer-implemented method of claim 1, further comprising:
   determining a location of a sample point within the search area; and
   calculating the POI density based on the sample point.

3. The computer-implemented method of claim 1, further comprising:
   identifying POIs within the increased or decreased boundaries of the search area; and
   providing POI information for an electronic map, the POI information being associated with one or more POIs of the identified POIs.

4. The computer-implemented method of claim 3, wherein the POI information includes latitude and longitude information for the one or more identified POIs.

5. The computer-implemented method of claim 3, further comprising:
   dividing the route into a plurality of segments when the route distance is greater than or equal to the distance threshold;
   defining a segment search area for one of the segments;
   determining a location of a sample point within the segment search area;
   calculating a segment POI density of the segment search area;
   comparing the segment POI density with the first density threshold and the second density threshold;
   adjusting the boundaries of the segment search area based on a result of the comparison;
   searching for POIs in the adjusted segment search area; and
   updating the POI information based on the search for POIs in the adjusted segment area.

6. The computer-implemented method of claim 3, further comprising:
   receiving search criteria from a user identifying a type of POI; and
   searching for the POIs based on the type of POI identified by the search criteria.

7. A system for adjusting search areas, the system comprising:
   an input device for receiving input specifying information for a route;
   a processor configured to:
      determine a route distance based on the information for the route;
      compare the route distance with a distance threshold;
      definite a search area when the route distance is less than the distance threshold, the search area including boundaries;
      calculate a points of interest (POI) density of the search area;
      determine if the POI density is greater than a first density threshold and less than a second density threshold;
      increase the boundaries of the search area when it is determined that the POI density is less than the first density threshold; and
      decrease the boundaries of the search area when it is determined that the POI density is greater than the second density threshold.

8. The system of claim 7, wherein the processor is further configured to:
   determine a location of a sample point within the search area; and
   calculate the POI density based on the sample point.

9. The system of claim 7, wherein the processor is further configured to:
- identify POIs within the increased or decreased boundaries of the search area; and
- provide POI information for an electronic map, the POI information being associated with one or more POIs of the identified POIs.

10. The system of claim 9, wherein the POI information includes latitude and longitude information for the one or more identified POIs.

11. The system of claim 9, wherein the processor is further configured to:
- divide the route into a plurality of segments when the route distance is greater than or equal to the distance threshold;
- define a segment search area for one of the segments;
- determine a location of a sample point within the segment search area;
- calculate a segment POI density of the segment search area;
- compare the segment POI density with the first density threshold and the second density threshold;
- adjust the boundaries of the segment search area based on a result of the comparison;
- search for POIs in the adjusted segment search area; and
- update the POI information based on the search for POIs in the adjusted segment area.

12. The system of claim 9, wherein the processor is further configured to:
- receive search criteria from a user identifying a type of POI; and
- search for the POIs based on the type of POI identified by the search criteria.

13. A computer-readable storage medium storing a program which, when executed by a computer processor, causes the computer processor to:
- determine a route distance based on information for a route;
- compare the route distance with a distance threshold;
- define a search area when the route distance is less than the distance threshold, the search area including boundaries;
- calculate a points of interest (POI) density of the search area;
- determine if the POI density is greater than a first density threshold and less than a second density threshold;
- increase the boundaries of the search area when it is determined that the POI density is less than the first density threshold; and
- decrease the boundaries of the search area when it is determined the POI density is greater than the second density threshold.

14. The computer-readable storage medium of claim 13, wherein the program further causes the computer processor to:
- determine a location of a sample point within the search area; and
- calculate the POI density based on the sample point.

15. The computer-readable storage medium of claim 13, wherein the program further causes the computer processor to:
- identify POIs within the increased or decreased boundaries of the search area; and
- provide POI information for an electronic map, the POI information being associated with one or more POIs of the identified POIs.

16. The computer-readable storage medium of claim 15, wherein the POI information includes latitude and longitude information for the one or more identified POIs.

17. The computer-readable storage medium of claim 15, wherein the program further causes the computer processor to:
- divide the route into a plurality of segments when the route distance is greater than or equal to the distance threshold;
- define a segment search area for one of the segments;
- determine a location of a sample point within the segment search area;
- calculate a segment POI density of the segment search area;
- compare the segment POI density with the first density threshold and the second density threshold;
- adjust the boundaries of the segment search area based on a result of the comparison;
- search for POIs in the adjusted segment search area; and
- update the POI information based on the search for POIs in the adjusted segment area.

18. The method of claim 5, further comprising:
incorporating segment POI information with the POI information for the electronic map display.

19. The system of claim 11, wherein the processor is further configured to:
- incorporate segment POI information with the POI information for the electronic map display.

20. The computer-readable storage medium of claim 17, wherein the program further causes the computer processor to:
- incorporate segment POI information with the POI information for the electronic map display.

* * * * *